US010423479B2

(12) United States Patent
Gaza et al.

(10) Patent No.: US 10,423,479 B2
(45) Date of Patent: Sep. 24, 2019

(54) EARLY DIAGNOSIS OF HARDWARE, SOFTWARE OR CONFIGURATION PROBLEMS IN DATA WAREHOUSE SYSTEM UTILIZING GROUPING OF QUERIES BASED ON QUERY PARAMETERS

(71) Applicant: International Business Machines Corporation, Armonk, NY (US)

(72) Inventors: Lukasz Gaza, Jankowice (PL); Artur M. Gruszecki, Cracow (PL); Tomasz Kazalski, Cracow (PL); Bartlomiej T. Malecki, Slomniki (PL); Konrad K. Skibski, Zielonki (PL); Tomasz Stradomski, Bedzin (PL)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/617,201

(22) Filed: Jun. 8, 2017

(65) Prior Publication Data
US 2017/0269982 A1 Sep. 21, 2017

Related U.S. Application Data

(63) Continuation of application No. 14/924,992, filed on Oct. 28, 2015, now Pat. No. 9,778,973.

(51) Int. Cl.
*G06F 11/07* (2006.01)
*G06F 16/21* (2019.01)
(Continued)

(52) U.S. Cl.
CPC .......... *G06F 11/079* (2013.01); *G06F 11/076* (2013.01); *G06F 11/0727* (2013.01);
(Continued)

(58) Field of Classification Search
CPC combination set(s) only.
See application file for complete search history.

(56) References Cited

U.S. PATENT DOCUMENTS 8,392,404 B2 * 3/2013 Brown .............. G06F 17/30545
707/719
8,510,273 B2 * 8/2013 Richards ........... G06F 17/30306
707/688

(Continued)

FOREIGN PATENT DOCUMENTS

CN 103778198 A 5/2014
WO 2014101845 A1 7/2014

OTHER PUBLICATIONS

List of IBM Patents or Patent Applications Treated as Related, Jun. 8, 2017, pp. 1-2.

(Continued)

*Primary Examiner* — Amine Riad
(74) *Attorney, Agent, or Firm* — Robert A. Voigt, Jr.; Winstead, P.C.

(57) ABSTRACT

A method, system and computer program product for providing early diagnosis of hardware, software or configuration problems in a data warehouse system. A received query is parsed to determine the properties of the query. The query may then be joined to existing groups of queries if those groups have shared properties of the query. After executing the query according to an execution plan, results from the execution of the query is received, which may include problem(s) that occurred during execution of the query. For those problems that reach a pre-defined threshold of becoming a "group problem" in those groups joined by the query, the problem is reported to the end user concerning those groups where the problem exceeds the pre-defined threshold. In this manner, an early diagnosis of the problems in the
(Continued)

data warehouse system that can cause delay and failure of the processing of queries is able to occur.

20 Claims, 5 Drawing Sheets

(51) Int. Cl.
　　G06F 16/25　　(2019.01)
　　G06F 16/2455　(2019.01)
　　G06F 16/2457　(2019.01)
　　G06F 11/34　　(2006.01)

(52) U.S. Cl.
　　CPC ...... *G06F 11/0745* (2013.01); *G06F 11/0754* (2013.01); *G06F 11/0772* (2013.01); *G06F 11/0787* (2013.01); *G06F 11/34* (2013.01); *G06F 16/21* (2019.01); *G06F 16/2456* (2019.01); *G06F 16/24578* (2019.01); *G06F 16/252* (2019.01)

(56) References Cited

U.S. PATENT DOCUMENTS

| | | |
|---|---|---|
| 8,732,171 B2 | 5/2014 | Paparizos et al. |
| 8,938,644 B2 * | 1/2015 | Clark ................. G06F 11/0727 707/718 |
| 9,424,114 B2 * | 8/2016 | Horman ................. G06F 11/07 |
| 2008/0306950 A1 * | 12/2008 | Richards ................. G06F 9/505 |
| 2013/0208978 A1 | 8/2013 | Ribnick et al. |
| 2014/0101130 A1 | 4/2014 | Kang et al. |
| 2014/0237289 A1 * | 8/2014 | de Castro Alves ... G06F 11/202 714/11 |
| 2014/0280083 A1 | 9/2014 | Sayed et al. |
| 2014/0281748 A1 * | 9/2014 | Ercegovac .......... G06F 11/0727 714/49 |
| 2016/0306877 A1 | 10/2016 | Winther |

OTHER PUBLICATIONS

Chaiken et al., "SCOPE: Easy and Efficient Parallel Processing of Massive Data Sets," PVLDB'08, Aug. 23-28, 2008, Auckland, New Zealand, pp. 1265-1276.

Shnaiderman et al., "A Parallel Tree Pattern Query Processing Algorithm for Graph Databases Using a GPGPU," Workshop Proceedings of the EDBT/ICDT 2015 Joint Conference, Mar. 27, 2015, Brussels, Belgium, pp. 1-8.

* cited by examiner

EARLY DIAGNOSIS OF HARDWARE, SOFTWARE OR CONFIGURATION PROBLEMS IN DATA WAREHOUSE SYSTEM UTILIZING GROUPING OF QUERIES BASED ON QUERY PARAMETERS

TECHNICAL FIELD

The present invention relates generally to data warehouses, and more particularly to early diagnosis of hardware, software or configuration problems in a data warehouse system utilizing the grouping of queries based on the query parameters (e.g., user defined functions).

BACKGROUND

A data warehouse system, also referred to as an "enterprise data warehouse," is a system used for reporting and data analysis. Data warehouses are central repositories of integrated data from one or more disparate sources. Data warehouses store both current and historical data and are used for creating analytical reports for knowledge workers throughout the enterprise. Examples of reports could range from annual and quarterly comparisons and trends to detailed daily sales analyses.

In such a system, various types of data may be loaded. Furthermore, the number of users and the types of reports that are generated may vary. Additionally, various types of hardware may be utilized and complex configurations may be introduced to the data warehouse system by the user. As a result, various problems may occur in the data warehouse system, such as hardware problems, software problems and configuration problems.

The processing of queries submitted to the data warehouse system may be delayed, fail, etc. because of any of these problems. Due to the large number of queries executed on the data warehouse system, the high complexity of the query operations executed on the data warehouse system and the inter-dependencies between the system components (both physical and logical), there has not been a means for effectively diagnosing the problems causing the delay or failure of the processing of the queries. As a result, it may be difficult to determine which query-level problems require attention and which do not.

Currently, monitoring systems attempting to detect and determine which hardware, software and configuration problems in the data warehouse system caused the delay or failure of the processing of the queries focus on predictive monitoring of the hardware, checking the data/system catalog for consistency as well as monitoring the performance of the queries over time. Such systems are deficient in only focusing on particular aspects of the data warehouse system thereby not providing early diagnosis of the hardware, software and configuration problems in the data warehouse system that can cause delay and failure of the processing of queries to the data warehouse system.

SUMMARY

In one embodiment of the present invention, a method for providing early diagnosis of hardware, software or configuration problems in a data warehouse system comprises receiving a query from a client device. The method further comprises parsing the query to determine one or more properties of the query, where the one or more properties are represented as a vector. The method additionally comprises joining the query to one or more groups of queries with shared properties of the query in response to the one or more groups of queries sharing one or more of the one or more properties of the query. Furthermore, the method comprises executing the query according to an execution plan. Additionally, the method comprises receiving results from the execution of the query in all groups associated with the query, where the results indicate a problem during the execution of the query. In addition, the method comprises ranking, by a processor, the problem in each of the one or more groups of queries joined by the query. The method further comprises reporting, by the processor, the problem to a user concerning one or more of the one or more groups of queries joined by the query in response to the problem reaching a pre-defined threshold of becoming a group problem in the one or more of the one or more groups of queries joined by the query based on the ranking of the problem.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for providing early diagnosis of hardware, software or configuration problems in a data warehouse system. In one embodiment of the present invention, a received query is parsed to determine the properties of the query. For example, the properties of the query may correspond to the database tables scanned during execution of the query, user defined functions that are used within the query text as well as the user which executes the query. The query may then be joined to existing one or more groups of queries if those groups have shared properties of the query and/or a new group of queries is created associated with the properties of the query not found in the existing groups. After executing the query according to an execution plan, results from the execution of the query is received, which may include problem(s) (e.g., performance problems, exceptions, errors, processing skews, data skews, resource shortages, locks on tables/rows) that occurred during execution of the query. The problem resulting from the execution of the query in each of the groups joined by the query is then ranked. For those problems that reach a pre-defined threshold of becoming a "group problem" (a "group problem" refers to a problem experienced by a threshold number of queries for the group of queries, where such a threshold may vary depending on the type of problem and its ranking) in those groups joined by the query, the problem is reported to the end user concerning those groups where the problem exceeds the pre-defined threshold. In this manner, an early diagnosis of the hardware, software and configuration problems in the data warehouse system that can cause delay and failure of the processing of queries to the data warehouse system is able to occur.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
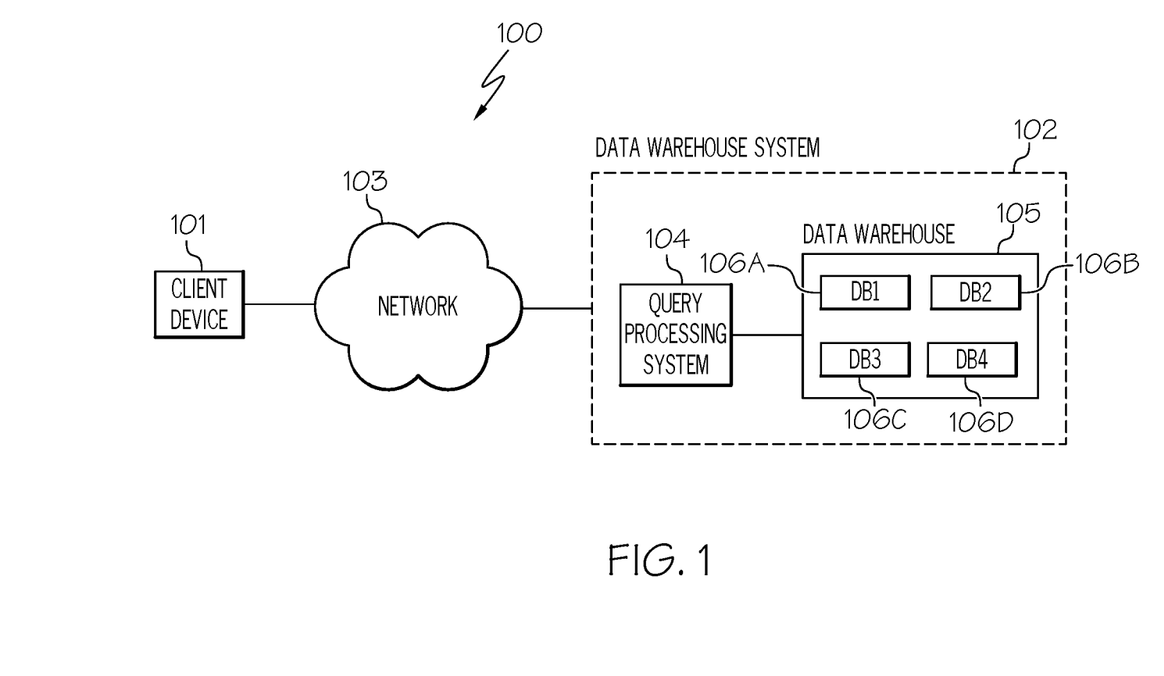
FIG. 1 illustrates a query transaction system for practicing the principles of the present invention in accordance with an embodiment of the present invention.

Referring now to the Figures in detail, FIG. 1 illustrates a query transaction system 100 for practicing the principles of the present invention in accordance with an embodiment of the present invention. Query transaction system 100 includes a client device 101 connected to a data warehouse system 102 via a network 103.

Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with data warehouse system 102.

Data warehouse system 102 includes a query processing system 104, such as a massive parallel processing computer system, configured to process queries from client device 101. Furthermore, data warehouse system 102 includes a data warehouse 105 housing one or more databases (identified as "DB" in FIG. 1) 106A-106D. Databases 106A-106D may collectively or individually be referred to as databases 106 or database 106, respectively. While FIG. 1 illustrates data warehouse 105 utilizing four databases 106, data warehouse 105 may utilize any number of databases for storing data from various disparate sources. Furthermore, data warehouse system 102 may include any number of query processing systems 104. A description of the hardware configuration of query processing system 104 is provided below in connection with FIG. 2.

System 100 is not to be limited in scope to any one particular network architecture. System 100 may include any number of client devices 101, data warehouse systems 102 and networks 103.

Figure 2:
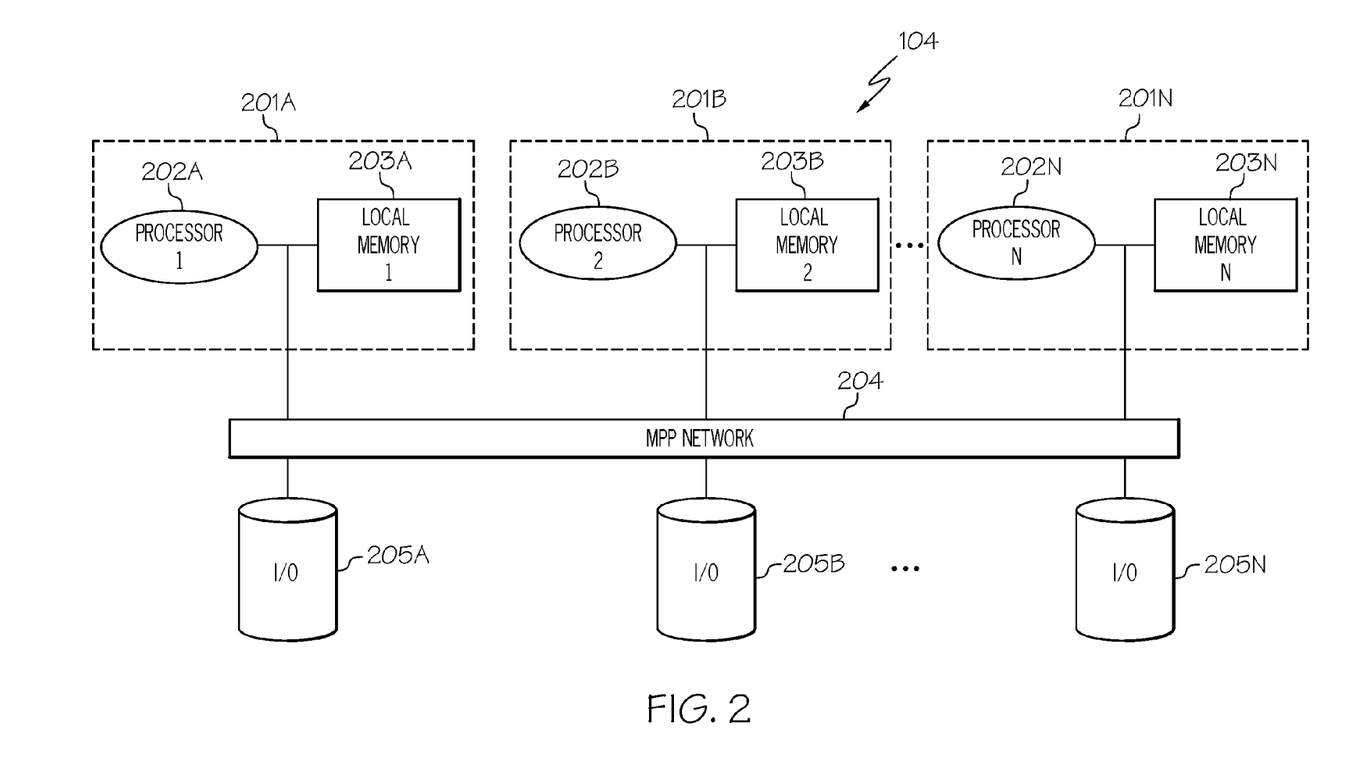
FIG. 2 illustrates a hardware configuration of a query processing system being a massive parallel processing computer system in accordance with an embodiment of the present invention.

Referring now to FIG. 2, FIG. 2 illustrates a hardware configuration of query processing system 104 (FIG. 1) being a massive parallel processing computer system. The principles of the present invention are not to be limited in scope to query processing system 104 being a massive parallel processing computer system. Query processing system 104 may be any type of system configured with the capability of processing queries from client device 101 (FIG. 1) for data warehouse system 102 (FIG. 1). A person of ordinary skill in the art would be capable of applying the principles of the present invention to such implementations. Further, embodiments applying the principles of the present invention to such implementations would fall within the scope of the present invention.

As illustrated in FIG. 2, query processing system 104 may contain hundreds, thousands or more processing nodes 201A-201N, where N is a positive integer number. Nodes 201A-201N may collectively or individually be referred to as nodes 201 or node 201, respectively.

Each node 201 may include a processor connected to a local memory unit and associated support circuitry (not shown). For example, node 201A includes processor 202A (labeled as "processor 1" in FIG. 2) connected to local memory 203A (labeled as "local memory 1" in FIG. 2), node 201B includes processor 202B (labeled as "processor 2" in FIG. 2) connected to local memory 203B (labeled as "local memory 2" in FIG. 2) and node 201N includes processor 202N (labeled as "processor N" in FIG. 2) connected to local memory 203N (labeled as "local memory N" in FIG. 2), where N is a positive integer number. Processors 202A-202N may collectively or individually be referred to as processors 202 or processor 202, respectively. Local memories 203A-203N may collectively or individually be referred to as local memories 203 or local memory 203, respectively.

Each of the processing nodes 201 is linked to each other via a massive parallel processing (MPP) processing network 204. Further, various I/O data elements 205A-205N provide I/O to the various nodes 201 in query processing system 104.

As evident, the configuration of query processing system 104 depicted in FIG. 2 may vary significantly. An MPP system is nominally composed of multiple nodes, where each node is connected via communication networks, such as InfiniBand or Ethernet, and communicates via network protocols, such as TCP/IP and the like. Each node is composed of at least one computing element, which in turn is composed of one or more cores. Storage media (generally memory) is local to each node and shared among the computing element(s). These resources could be located in the same physical system, same rack, same location, or anywhere in the world as long as these criteria are met.

In one embodiment, one or more local memories 203 may store applications to be executed by the associated processor 202. An example of such an application includes an application for early diagnosis of hardware, software or configuration problems in data warehouse system 102 utilizing the grouping of queries based on the query parameters (e.g., user defined functions) as discussed below in association with FIGS. 3A-3B and 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, data warehouses are central repositories of integrated data from one or more disparate sources. Data warehouses store both current and historical data and are used for creating analytical reports for knowledge workers throughout the enterprise. Examples of reports could range from annual and quarterly comparisons and trends to detailed daily sales analyses. In such a system, various types of data may be loaded. Furthermore, the number of users and the types of reports that are generated may vary. Additionally, various types of hardware may be utilized and complex configurations may be introduced to the data warehouse system by the user. As a result, various problems may occur in the data warehouse system, such as hardware problems, software problems and configuration problems. The processing of queries submitted to the data warehouse system may be delayed, fail, etc. because of any of these problems. Due to the large number of queries executed on the data warehouse system, the high complexity of the query operations executed on the data warehouse system and the inter-dependencies between the system components (both physical and logical), there has not been a means for effectively diagnosing the problems causing the delay or failure of the processing of the queries. As a result, it may be difficult to determine which query-level problems require attention and which do not. Currently, monitoring systems attempting to detect and determine which hardware, software and configuration problems in the data warehouse system caused the delay or failure of the processing of the queries focus on predictive monitoring of the hardware, checking the data/system catalog for consistency as well as monitoring the performance of the queries over time. Such systems are deficient in only focusing on particular aspects of the data warehouse system thereby not providing early diagnosis of the hardware, software and configuration problems in the data warehouse system that can cause delay and failure of the processing of queries to the data warehouse system.

Figure 3A:
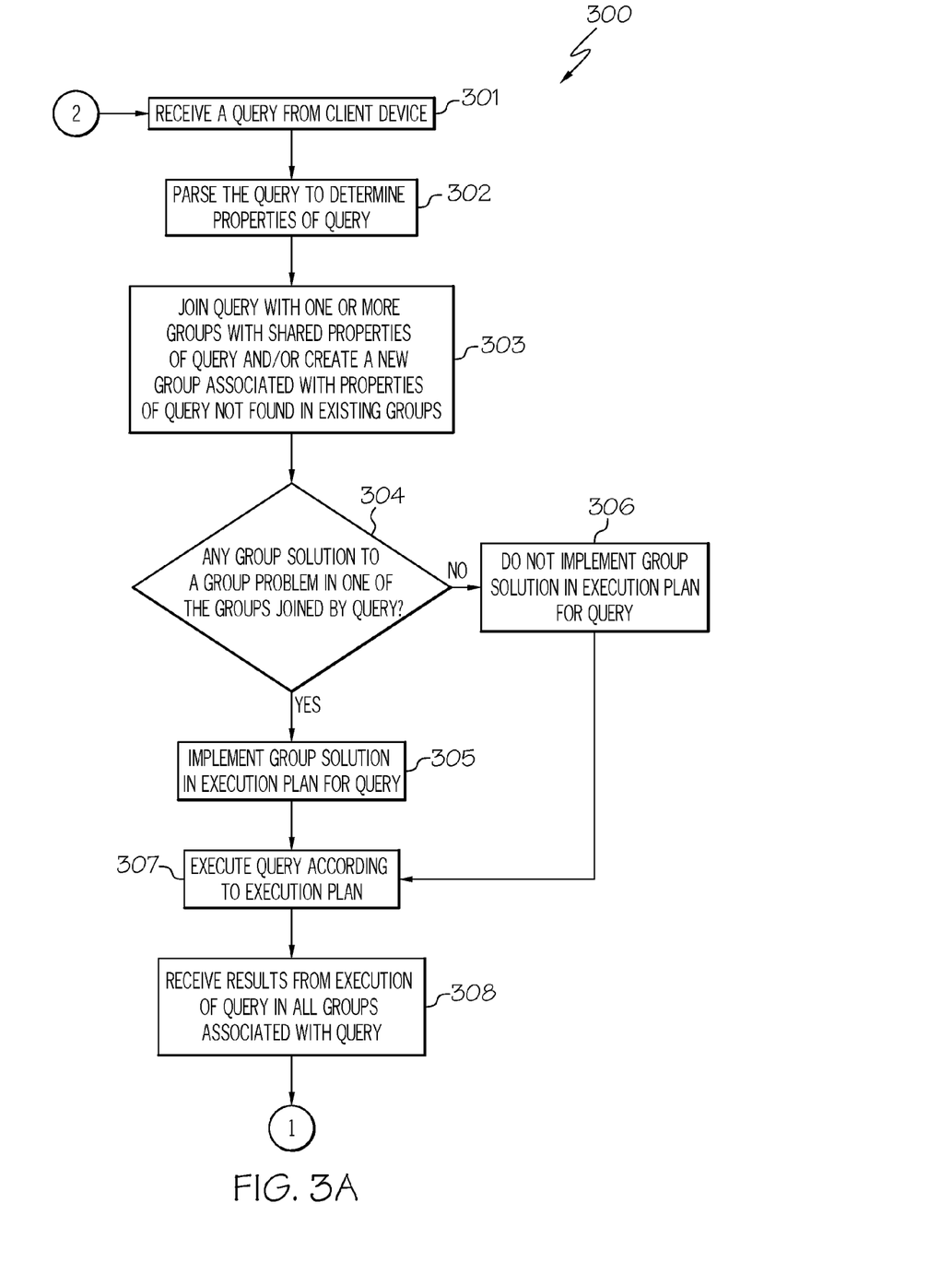
FIGS. 3A-3B are a flowchart of a method for providing early diagnosis of the hardware, software and configuration problems in the data warehouse system utilizing the grouping of queries based on the query parameters in accordance with an embodiment of the present invention.
Figure 3B:
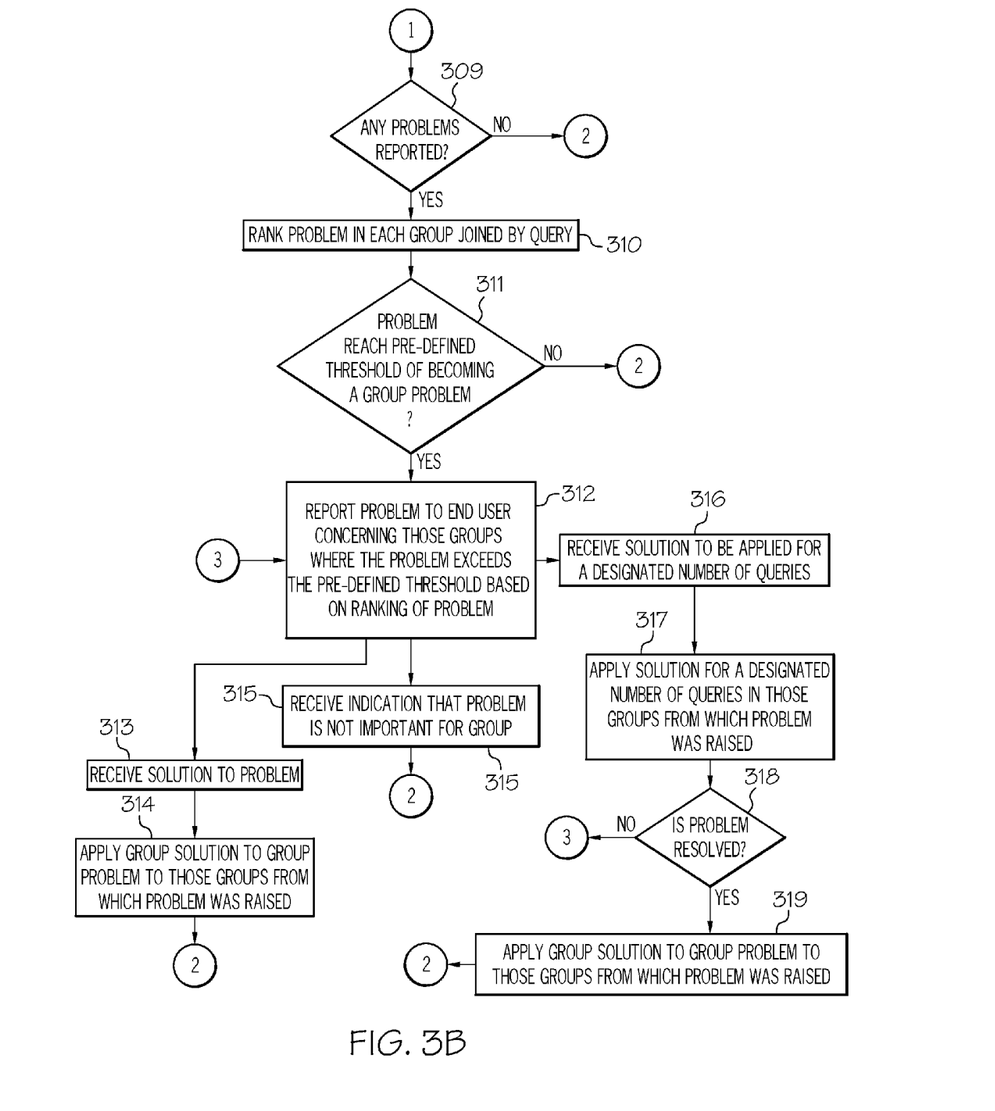
Figure 4:
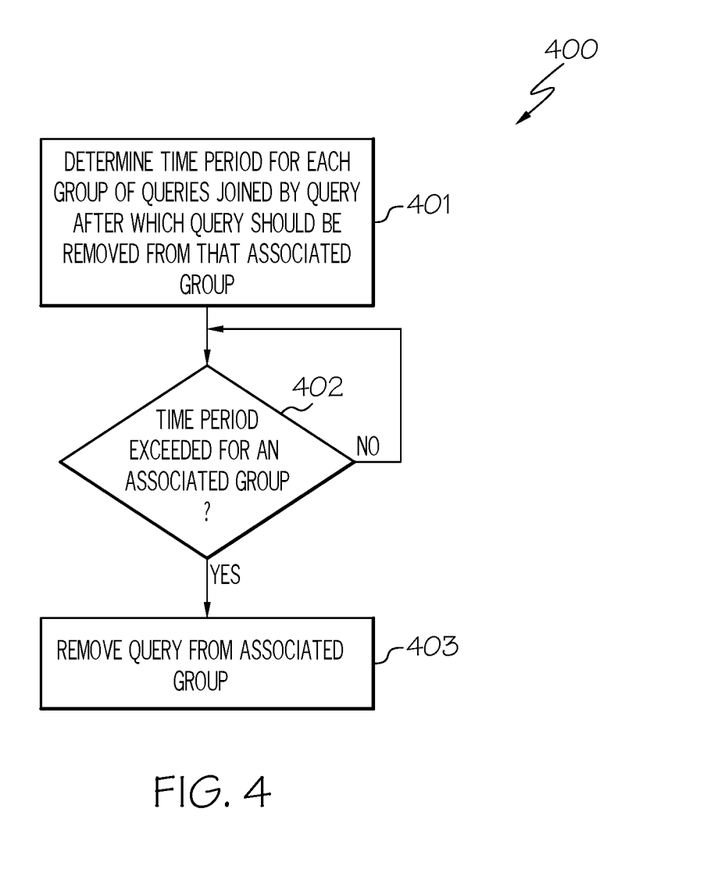
FIG. 4 is a flowchart of a method for removing a query from an assigned group of queries in accordance with an embodiment of the present invention.

The principles of the present invention provide a means for providing early diagnosis of the hardware, software and configuration problems in the data warehouse system utilizing the grouping of queries based on the query parameters (e.g., user defined functions) as discussed below in connection with FIGS. 3A-3B and 4. FIGS. 3A-3B are a flowchart of a method for providing early diagnosis of the hardware, software and configuration problems in the data warehouse system utilizing the grouping of queries based on the query parameters. FIG. 4 is a flowchart of a method for removing a query from an assigned group of queries.

As stated above, FIGS. 3A-3B are a flowchart of a method 300 for providing early diagnosis of the hardware, software and configuration problems in the data warehouse system utilizing the grouping of queries based on the query parameters in accordance with an embodiment of the present invention.

Referring to FIG. 3A, in conjunction with FIGS. 1-2, in step 301, query processing system 104 receives a query from client device 101.

In step 302, query processing system 104 parses the query to determine the properties of the query. For example, the properties of the query may correspond to the database tables scanned during execution of the query, user defined functions that are used within the query text as well as the user which executes the query. In one embodiment, such properties may be represented as a vector. In one embodiment, the vectors may be represented in a tree structure.

In step 303, query processing system 104 joins the query with one or more groups of queries with shared properties of the query and/or creates a new group associated with the properties of the query that were not found in existing groups. A "group of queries" (also referred to herein as simply "groups"), as used herein, refer to queries with the same shared properties. For example, group 1 may correspond to those queries having the vector of (TAB 1, null) referring to those queries that scan the database table (TAB 1) and do not use any user defined functions. Group 2 may correspond to those queries having the vector of (TAB 1) referring to those queries that scan the database table (TAB 1). Group 3 may correspond to those queries having the vector of (TAB 1, TAB 2, UDF 1) corresponding to those queries that scan the databases tables (TAB 1 and TAB 2) as well as use the user defined function (UDF) of UDF 1. Group 4 may correspond to those queries having the vector of (UDF 1) corresponding to those queries that use the user defined function (UDF) of UDF 1. A query may belong to more than one group. Furthermore, a new group may be created associated with the properties of the query that were not found in the existing groups as illustrated below.

For example, if the query parsed in step 302 had the properties represented in the following vector (TAB 1, TAB 2, UDF 1, UDF 2), where the query scanned the database tables, TAB 1 and TAB 2, and used the user defined functions of UDF 1 and UDF 2, then the query would be joined to Groups 2, 3 and 4 discussed above. Furthermore, query processing system 104 would create a new group, Group 5, represented with the following vector (TAB 1, TAB 2, UDF 1, UDF 2).

As discussed below, by determining the properties of the query and joining the query to group(s) with shared properties of the query, early diagnosis of the hardware, software and configuration problems in data warehouse system 102 that can cause delay and failure of the processing of queries to data warehouse system 102 is able to occur.

In step 304, a determination is made by query processing system 104 as to whether there is any group solution to a group problem in one of the groups joined by the query. A "group solution," as used herein, refers to a solution (e.g., configuration settings applied before executing the query, changes in resource assignments, changes in workload management, etc.) that is applied to a "group problem" for a designated group of queries. A "group problem" refers to a problem (e.g., hardware problem, software problem or configuration problem, such as performance problems, exceptions, errors, processing skews, data skews, resource shortages, locks on tables/rows, etc.) experienced by a threshold number of queries for the group of queries, where such a threshold may vary depending on the type of problem and its ranking. For example, a more serious problem may require a lower threshold to trigger a group solution than a less serious problem. A more detail description regarding group solutions and group problems is provided further below.

If there is a group solution to a group problem in one of the groups joined by the query, then, in step 305, query processing system 104 implements the group solution in the execution plan for the query.

If, however, there is not a group solution to a group problem in one of the groups joined by the query, then, in step 306, query processing system 104 does not implement a group solution in the execution plan for the query.

After implementing or not implementing a group solution in the execution plan for the query, in step 307, query processing system 104 executes the query according to the execution plan.

In step 308, query processing system 104 receives the results from the execution of the query in all groups associated with the query.

Referring to FIG. 3B, in conjunction with FIGS. 1-2, in step 309, a determination is made by query processing system 104 as to whether any problems were reported. Such problems may include, but are not limited to, performance problems, exceptions, errors, processing skews, data skews, resource shortages, locks on tables/rows, etc. Problems may be detected in many manners via many different types of monitoring systems and will not be discussed herein in detail for the sake of brevity. The principles of the present invention are to include any type of monitoring system capable of detecting the problems discussed herein. A person of ordinary skill in the art would be capable of applying the principles of the present invention to such implementations. Further, embodiments applying the principles of the present invention to such implementations would fall within the scope of the present invention.

If there are no problems reported, then query processing system 104 waits to receive a subsequent query from client device 101 in step 301.

If, however, there is a problem reported, then, in step 310, query processing system 104 ranks the problem in each of the groups joined by the query. In one embodiment, the problems are ranked based on the severity of the problem, priority of the query, number of other queries that are impacted, etc. For example, problems, such as an exception from a user defined function or an out of memory error, would have a higher rank than an intermediate processing skew due to the severity of those problems not allowing a final query result. For example, a problem, such as an intermediate processing skew (e.g., one of the processing units 202 performed more work than other processing units 202) may be ranked 3 in a 10 point scale; whereas, an exception that occurred during execution of a user defined function on a table may be ranked 10 in a 10 point scale.

In step 311, query processing system 104 determines whether the problem has reached a pre-defined threshold of becoming a group problem in each of the groups joined by the query. Such a pre-defined threshold may depend, at least in part, on the number of queries that are members of the group. Furthermore, the pre-defined threshold may depend on the type of problem and the ranking of the problem discussed in step 310. A higher ranked problem would have a lower pre-defined threshold of becoming a group problem than a lower ranked problem.

If the problem does not exceed a pre-defined threshold of becoming a group problem, then query processing system 104 waits to receive a subsequent query from client device 101 in step 301.

If, however, the problem exceeds a pre-defined threshold of becoming a group problem, then, in step 312, query processing system 104 reports the problem to the end user concerning those groups where the problem exceeds the pre-defined threshold based on the ranking of the problem in step 310.

For example, if the query joined Group 2 and the problem reported pertained to an intermediate processing skew and half of the group members have already raised it, then by the query raising this problem a further time may cause the threshold to be reached thereby having the problem reported to the end user concerning Group 2. The report though may not indicate any problems concerning Groups 3 and 4 (other groups joined by the query) if an insignificant number of other members in those groups have reported such a problem.

In another example, if a severe problem, such as an exception problem is reported, then such a problem may automatically exceed the threshold due to the severity of the problem. For example, if the query joined Groups 2, 3 and 4, then such a problem may be reported to the end user concerning all three groups.

In response to reporting the problem to the end user, in step 313, query processing system 104 receives a solution (e.g., configuration settings applied before executing the query, changes in resource assignments, changes in workload management, etc.) to the problem.

In step 314, query processing system 104 applies the solution as a group solution to the problem (i.e., group problem) to those groups from which the problem was raised. That is, query processing system 104 applies the solution to the problem in those groups in which the problem reached a pre-defined threshold. In one embodiment, such a solution and the application of such a solution may be automatically applied. In one embodiment, such a solution is provided by the end user and applied by query processing system 104.

Query processing system 104 then waits to receive a subsequent query from client device 101 in step 301.

Alternatively to receiving a solution and applying the solution in steps 313, 314, in step 315, query processing system 104 receives an indication that the problem is not important for the group in which the problem reached a pre-defined threshold. Query processing system 104 then waits to receive a subsequent query from client device 101 in step 301.

Alternatively to performing steps 313-315, in step 316, query processing system 104 receives a solution to be applied for a designated number of queries in those groups in which the problem reached a pre-defined threshold. Such a mode of operation may be referred to herein as the "proof of concept mode." Such a mode of operation may be implemented to ensure that the solution is valid and operable. As a result, such a solution may only be implemented as a "group solution" if the solution is successful during the proof of concept mode of operation.

In step 317, query processing system 104 applies the solution for the designated number of queries in those groups in which the problem reached a pre-defined threshold.

In step 318, a determination is made by query processing system 104 as to whether the problem was resolved during the proof of concept mode of operation.

If the problem was not resolved, then query processing system 104 repeats the reporting of the problem to the end user concerning those groups where the problem exceeds the pre-defined threshold in step 312. The solution that was applied during the proof of concept mode of operation is withdrawn from consideration.

If, however, the problem was resolved, then, in step 319, query processing system 104 applies the solution as a group solution to the problem (i.e., group problem) in those groups in which the problem reached a pre-defined threshold.

Query processing system 104 then waits to receive a subsequent query from client device 101 in step 301.

The queries in the groups of queries may be removed from the list of members of that group after a period of time so that the group will not contain queries older than a defined age. Such a time period may be dependent upon how fast the data referenced by the queries is changing. For example, if the majority of the queries in a group are requesting last month's data, then such queries may be removed from the queries after one month they were received. In another example, if the data referenced by the majority of the queries in a group is archived after one year, then such queries may be removed from the group after one year they were received. A discussion of removing the queries from a group is provided below in connection with FIG. 4.

FIG. 4 is a flowchart of a method 400 for removing a query from an assigned group of queries in accordance with an embodiment of the present invention.

Referring to FIG. 4, in conjunction with FIGS. 1-2 and 3A-3B, in step 401, query processing system 104 determines the time period for each group of queries joined by the query after which the query should be removed from that associated group. As discussed above, such a time period may be dependent upon how fast the data referenced by the queries is changing.

In step 402, a determination is made by query processing system 104 as to whether the time period was exceeded for an associated group (i.e., a group joined by the query).

If the time period was not exceeded, then query processing system 104 continues to determine whether the time period was exceeded for an associated group in step 402.

If, however, the time period was exceeded, then, in step 403, query processing system 104 removes the query from the associated group.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing early diagnosis of hardware, software or configuration problems in a data warehouse system, the method comprising:
   receiving a query from a client device;
   parsing said query to determine one or more properties of said query, wherein said one or more properties are represented as a vector;
   joining said query to one or more groups of queries with shared properties of said query in response to said one or more groups of queries sharing one or more of said one or more properties of said query;
   executing said query according to an execution plan;
   receiving results from said execution of said query in all groups associated with said query, wherein said results indicate a problem during said execution of said query;
   ranking, by a processor, said problem in each of said one or more groups of queries joined by said query; and
   reporting, by said processor, said problem to a user concerning one or more of said one or more groups of queries joined by said query in response to said problem reaching a pre-defined threshold of becoming a group problem in said one or more of said one or more groups of queries joined by said query based on said ranking of said problem.

2. The method as recited in claim 1 further comprising:
   creating a new group of queries associated with said one or more properties of said query in response to said one or more properties not being associated with any existing groups of queries.

3. The method as recited in claim 1 further comprising:
   implementing a solution to a second problem in said execution plan of said query in response to said query joining a group associated with said solution to said second problem.

4. The method as recited in claim 1 further comprising:
   receiving a solution to said problem; and
   applying said solution to said problem to said one or more of said one or more groups of queries joined by said query.

5. The method as recited in claim 4, wherein said problem comprises one of the following: an exception, processing skew, data skew, and resource shortage, wherein said solution comprises one of the following: configuration settings applied before executing said query, and changes in resource assignments.

6. The method as recited in claim 1, wherein said problem is ranked in each of said one or more groups of queries joined by said query based on severity of said problem, priority of said query and number of other queries that are impacted.

7. The method as recited in claim 1, wherein said one or more properties of said query comprise one or more of the following: user defined functions, tables scanned during execution of said query and user which executes said query.

8. A computer program product for providing early diagnosis of hardware, software or configuration problems in a data warehouse system, the computer program product comprising a computer readable storage medium having program code embodied therewith, the program code comprising the programming instructions for:
   receiving a query from a client device;
   parsing said query to determine one or more properties of said query, wherein said one or more properties are represented as a vector;
   joining said query to one or more groups of queries with shared properties of said query in response to said one or more groups of queries sharing one or more of said one or more properties of said query;
   executing said query according to an execution plan;
   receiving results from said execution of said query in all groups associated with said query, wherein said results indicate a problem during said execution of said query;
   ranking said problem in each of said one or more groups of queries joined by said query; and
   reporting said problem to a user concerning one or more of said one or more groups of queries joined by said query in response to said problem reaching a pre-defined threshold of becoming a group problem in said one or more of said one or more groups of queries joined by said query based on said ranking of said problem.

9. The computer program product as recited in claim 8, wherein the program code further comprises the programming instructions for:
   creating a new group of queries associated with said one or more properties of said query in response to said one or more properties not being associated with any existing groups of queries.

10. The computer program product as recited in claim 8, wherein the program code further comprises the programming instructions for:
    implementing a solution to a second problem in said execution plan of said query in response to said query joining a group associated with said solution to said second problem.

11. The computer program product as recited in claim 8, wherein the program code further comprises the programming instructions for:
    receiving a solution to said problem; and
    applying said solution to said problem to said one or more of said one or more groups of queries joined by said query.

12. The computer program product as recited in claim 11, wherein said problem comprises one of the following: an exception, processing skew, data skew, and resource shortage, wherein said solution comprises one of the following: configuration settings applied before executing said query, and changes in resource assignments.

13. The computer program product as recited in claim 8, wherein said problem is ranked in each of said one or more groups of queries joined by said query based on severity of said problem, priority of said query and number of other queries that are impacted.

14. The computer program product as recited in claim 8, wherein said one or more properties of said query comprise one or more of the following: user defined functions, tables scanned during execution of said query and user which executes said query.

15. A system, comprising:
    a memory unit for storing a computer program for providing early diagnosis of hardware, software or configuration problems in a data warehouse system; and a processor coupled to the memory unit, wherein the processor is configured to execute the program instructions of the computer program comprising:

receiving a query from a client device;

parsing said query to determine one or more properties of said query, wherein said one or more properties are represented as a vector;

joining said query to one or more groups of queries with shared properties of said query in response to said one or more groups of queries sharing one or more of said one or more properties of said query;

executing said query according to an execution plan;

receiving results from said execution of said query in all groups associated with said query, wherein said results indicate a problem during said execution of said query;

ranking said problem in each of said one or more groups of queries joined by said query; and reporting said problem to a user concerning one or more of said one or more groups of queries joined by said query in response to said problem reaching a pre-defined threshold of becoming a group problem in said one or more of said one or more groups of queries joined by said query based on said ranking of said problem.

16. The system as recited in claim 15, wherein the program instructions of the computer program further comprise:

creating a new group of queries associated with said one or more properties of said query in response to said one or more properties not being associated with any existing groups of queries.

17. The system as recited in claim 15, wherein the program instructions of the computer program further comprise:

implementing a solution to a second problem in said execution plan of said query in response to said query joining a group associated with said solution to said second problem.

18. The system as recited in claim 15, wherein the program instructions of the computer program further comprise:

receiving a solution to said problem; and applying said solution to said problem to said one or more of said one or more groups of queries joined by said query.

19. The system as recited in claim 15, wherein said problem is ranked in each of said one or more groups of queries joined by said query based on severity of said problem, priority of said query and number of other queries that are impacted.

20. The system as recited in claim 15, wherein said one or more properties of said query comprise one or more of the following: user defined functions, tables scanned during execution of said query and user which executes said query.

* * * * *